(12) United States Patent
Graeber et al.

(10) Patent No.: US 11,274,598 B2
(45) Date of Patent: Mar. 15, 2022

(54) EXPANDED GAS TURBINE PROCESS WITH NATURAL GAS REGASIFICATION

(71) Applicant: Siemens Aktiengesellschaft, Munich (DE)

(72) Inventors: Carsten Graeber, Erlangen (DE); Uwe Juretzek, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/972,765

(22) PCT Filed: Jun. 21, 2019

(86) PCT No.: PCT/EP2019/066460
§ 371 (c)(1),
(2) Date: Dec. 7, 2020

(87) PCT Pub. No.: WO2020/007620
PCT Pub. Date: Jan. 9, 2020

(65) Prior Publication Data
US 2021/0239042 A1 Aug. 5, 2021

(30) Foreign Application Priority Data
Jul. 5, 2018 (EP) .................................... 18181921

(51) Int. Cl.
*F02C 3/00* (2006.01)
*F02C 3/04* (2006.01)
(Continued)

(52) U.S. Cl.
CPC .................. *F02C 3/04* (2013.01); *F02C 3/22* (2013.01); *F02C 7/12* (2013.01); *F05D 2220/32* (2013.01); *F05D 2260/20* (2013.01)

(58) Field of Classification Search
None
See application file for complete search history.

(56) References Cited

U.S. PATENT DOCUMENTS 5,295,350 A * 3/1994 Child ........................ F17C 9/04
60/780
6,457,315 B1 * 10/2002 Lee .......................... F02C 7/143
60/772
(Continued)

FOREIGN PATENT DOCUMENTS

DE  2833599 A1  2/1979
DE  102006008600 A1  8/2007
(Continued)

OTHER PUBLICATIONS

Bailes, Allison, Cold Airis Dry Air, Energy Vanguard, 2013 (Year: 2013).*
(Continued)

*Primary Examiner* — Edwin Kang
(74) *Attorney, Agent, or Firm* — Wolter Van Dyke Davis, PLLC

(57) ABSTRACT

A power plant with a multi-stage intercooled compressor, a combustion chamber, a turbine which is arranged downstream of the combustion chamber, a compressor air line which connects the compressor to the combustion chamber, and a first heat exchanger which is connected into the compressor air line and into an exhaust gas line branching off from the turbine. A first compressor air expander is arranged in the compressor air line between the first heat exchanger and the combustion chamber, and the power plant includes a device for regasifying liquid natural gas, having a natural gas line, wherein a heat exchanger device is connected into the natural gas line between two compressor stages of the compressor.

12 Claims, 7 Drawing Sheets

(51) Int. Cl.
F02C 3/22 (2006.01)
F02C 7/12 (2006.01)

(56) References Cited

U.S. PATENT DOCUMENTS

| | | | | |
|---|---|---|---|---|
| 2008/0190106 A1* | 8/2008 | Mak | ........................ | F01K 23/10 |
| | | | | 60/531 |
| 2012/0096869 A1* | 4/2012 | Kesseli | .................... | F02C 7/143 |
| | | | | 60/772 |
| 2014/0137563 A1* | 5/2014 | Kerth | ........................ | F02C 6/16 |
| | | | | 60/772 |

FOREIGN PATENT DOCUMENTS

| | | |
|---|---|---|
| DE | 102006046246 A1 | 2/2008 |
| EP | 0496283 A2 | 7/1992 |
| GB | 2002057 A | 2/1979 |
| JP | S55148907 A | 11/1980 |
| JP | S55153808 A | 12/1980 |

OTHER PUBLICATIONS

PCT International Search Report and Written Opinion of International Searching Authority dated Oct. 29, 2019 corresponding to PCT International Application No. PCT/EP2019/066460 filed Jun. 21, 2019.

* cited by examiner

EXPANDED GAS TURBINE PROCESS WITH NATURAL GAS REGASIFICATION

CROSS REFERENCE TO RELATED APPLICATIONS

This application is the US National Stage of International Application No. PCT/EP2019/066460 filed 21 Jun. 2019, and claims the benefit thereof. The International Application claims the benefit of European Application No. EP18181921 filed 5 Jul. 2018. All of the applications are incorporated by reference herein in their entirety.

FIELD OF INVENTION

The invention relates to a power station plant and also a method for the operation thereof.

BACKGROUND OF INVENTION

Liquid natural gas (LNG, 162° C.) is usually vaporized by means of ambient heat (for example air or seawater) or chemical heat. As an alternative, concepts which had the objective of utilizing the energy of low-temperature cold by means of cascaded ORCs were developed.

SUMMARY OF INVENTION

It is an object of the invention to provide a power station plant which allows energetically and economically improved vaporization, in particular at the large LNG terminals, and at the same time is very simple in terms of construction and is inexpensive. A further object of the invention is to indicate a corresponding method for operating such a power station plant.

The invention achieves the object directed to a power station plant by providing for such a power station plant comprising a multistage compressor with intermediate cooling, a combustion chamber, a turbine located downstream of the combustion chamber, a compressor air conduit which connects the compressor to the combustion chamber and a first heat exchanger installed in the compressor air conduit and in an exhaust gas conduit branching off from the turbine, where a first compressor air expander is arranged in the compressor air conduit between the first heat exchanger and the combustion chamber, to comprise a device for regasifying liquid natural gas having a natural gas conduit, where a heat transfer device is installed between two compressor stages of the compressor and in the natural gas conduit.

Coupling of the LNG vaporization with an optimized, recuperated gas turbine process makes it possible to achieve maximum utilization of the low-temperature cold for generating electric power with very high efficiencies and minimal costs.

An important aspect here is optimal process flow with reduced plant complexity and a minimal number of rotating components.

In an advantageous embodiment of the invention, the heat transfer device comprises a second heat exchanger which is installed between two compressor stages and in the natural gas conduit. In order to transfer the cold from the LNG vaporization into the actual gas turbine operating process, the LNG stream is utilized directly for intermediate cooling of the air compression in the recuperated gas turbine process. Maximum cooling in the air compression results in a minimal power requirement for the compressor, i.e. a significant increase in the process efficiency. This is all the more important since the air compression occurs to a significantly higher pressure than would be necessary for pure gas turbine operation because an additional gradient for the hot air expander has to be generated. The use of the second heat exchanger which transfers heat from the compressed air to the natural gas to be regasified, which type of heat exchanger is also referred to as a recuperator, results in cost and performance advantages due to the small outlays in terms of material. However, in this embodiment the LNG side is coupled to the working circuit, which has to be taken into account for the purposes of safety.

In order to rule out this disadvantage from the beginning, an alternative advantageous embodiment provides for the heat transfer device to comprise a nitrogen circuit having a nitrogen conduit in which a third heat exchanger and a fourth heat exchanger are installed, where the third heat exchanger is installed in the natural gas conduit between two compressor stages and the fourth heat exchanger. In this embodiment, the nitrogen is cooled to a maximum extent (<−120° C.) in order then to be utilized as cooling medium for the air compression in the recuperated gas turbine process. The proposed nitrogen circuit as pure intermediate circuit without working equipment (only a circulating blower) can advantageously be designed so that the nitrogen system pressure is above the LNG pressure, so that in the event of leakages in the LNG vaporizer inert nitrogen, which is not critical from a safety point of view, goes over to the LNG side.

The nitrogen circuit advantageously comprises a fifth heat exchanger which is firstly installed in the nitrogen conduit downstream, in the directional flow of the nitrogen, of the third heat exchanger and upstream of the fourth heat exchanger and is secondly installed in the exhaust gas conduit. As a result, the nitrogen that has already been heated by the compressor air can be heated further.

Furthermore, it is advantageous for a natural gas expander to be installed in the natural gas conduit downstream, in the flow direction of the natural gas, of the heat transfer device in order to achieve maximum efficiency.

It is advantageous here for a sixth heat exchanger to be arranged in the natural gas conduit upstream of the natural gas expander and a seventh heat exchanger to be arranged in the natural gas conduit downstream of the natural gas expander in order to heat natural gas before and after expansion. The heat which is transferred to the natural gas in the sixth and seventh heat exchangers can originate here as low-temperature heat from the power station plant, for example from a lubricating oil circuit. In general, all types of process heat having a temperature up to about 150° C. are possible so as to allow this concept to unfold its maximum potential.

It is also advantageous for a twelfth heat exchanger to be installed in the natural gas conduit between the heat transfer device and the natural gas expander and in the exhaust gas conduit. This twelfth heat exchanger enables further heat from the exhaust gas to be utilized by the natural gas expander.

It is advantageous for the power station plant to comprise a water-glycol circuit having an eighth heat exchanger in a compressor intake air conduit for cooling and drying the compressor intake air or a ninth heat exchanger between two compressor stages for cooling and drying the compressor air, and having a tenth heat exchanger which is installed in the compressor air conduit downstream of the compressor for heating the compressor air, an eleventh heat exchanger for further heating of the regasified natural gas and a twelfth heat exchanger for heating a water-glycol mixture in the water-glycol circuit.

An additional water-glycol circuit enables optimum distribution of heat in the process to be achieved. Via this circuit, heat is transferred from the air cooling to the still relatively cold side downstream of the air compression or to the nitrogen circuit before entry into the exhaust gas heat exchanger or to the cold natural gas. In addition, the water-glycol circuit (which is operated at temperatures of <0° C.) can be utilized for taking up further waste heat, e.g. from the generator cooler or the intake air cooling, and passed to use of its energy content in the overall processor. Since air cooling should, depending on the application, be carried out at temperatures of <−100° C. or down to <−150° C., it is absolutely necessary to separate off the water present in the air before the actual low-temperature cooling step. Here, the water present is advantageously condensed out after a first compression by means of the water-glycol circuit. Alternative methods for water/($CO_2$) removal are likewise possible. The eleventh heat exchanger for further heating of the regasified natural gas can be installed either directly in the natural gas conduit or, if a nitrogen circuit is present, in the latter and can heat the natural gas further indirectly via the nitrogen circuit.

The use of the compressor air expander enables the exhaust gas heat to be utilized to a maximum extent since in this case only the temperature limit of the expander, which is significantly above the temperature limit of the downstream gas turbine region (combustion chamber+air cooling system), has to be taken into account for heat transfer. It is therefore advantageous for a second compressor air expander to be arranged downstream of the first compressor air expander and to be connected on the inlet side to the compressor air conduit at a position downstream of the first compressor air expander and on the outlet side to open into the exhaust gas conduit.

The object directed to a method is achieved by a method for operating a power station plant comprising a multistage compressor with intermediate cooling, a combustion chamber and a turbine, in which an exit pressure of the compressor is selected so as to be higher than a required turbine entry pressure and in which the compressor air is expanded before combustion, wherein liquid natural gas is regasified using heat arising in the compression of air.

For safety reasons, it can be useful for heat to be transferred from the compressor air to the natural gas via a nitrogen circuit located in between.

To improve the process further, it is advantageous for liquid natural gas to be brought to pressure, regasified and subsequently expanded to produce energy.

It is advantageous here for regasified natural gas to be heated by means of a further heat source before and after expansion.

Finally, it is advantageous for compressor intake air to be cooled and dried by means of a water-glycol circuit.

The invention has a number of advantages. Firstly, the power station plant according to the invention does not require any additional water for operation. The process structure is comparatively simple and thus also makes comparatively simple regulation possible. The inventive power station plant is extremely cheap since only a minimal number of rotating components is required and it offers safety advantages for integration into the LNG system (few interfaces, unproblematical handling of leakages). The concept performance is independent of the LNG system pressure. Depending on the embodiment, maximum plant efficiencies of up to 73% can be attained.

BRIEF DESCRIPTION OF THE DRAWINGS

The invention will be illustrated in more detail by way of example with the aid of the drawings. The drawings show, schematically and not true to scale.

DETAILED DESCRIPTION OF INVENTION

Figure 1:
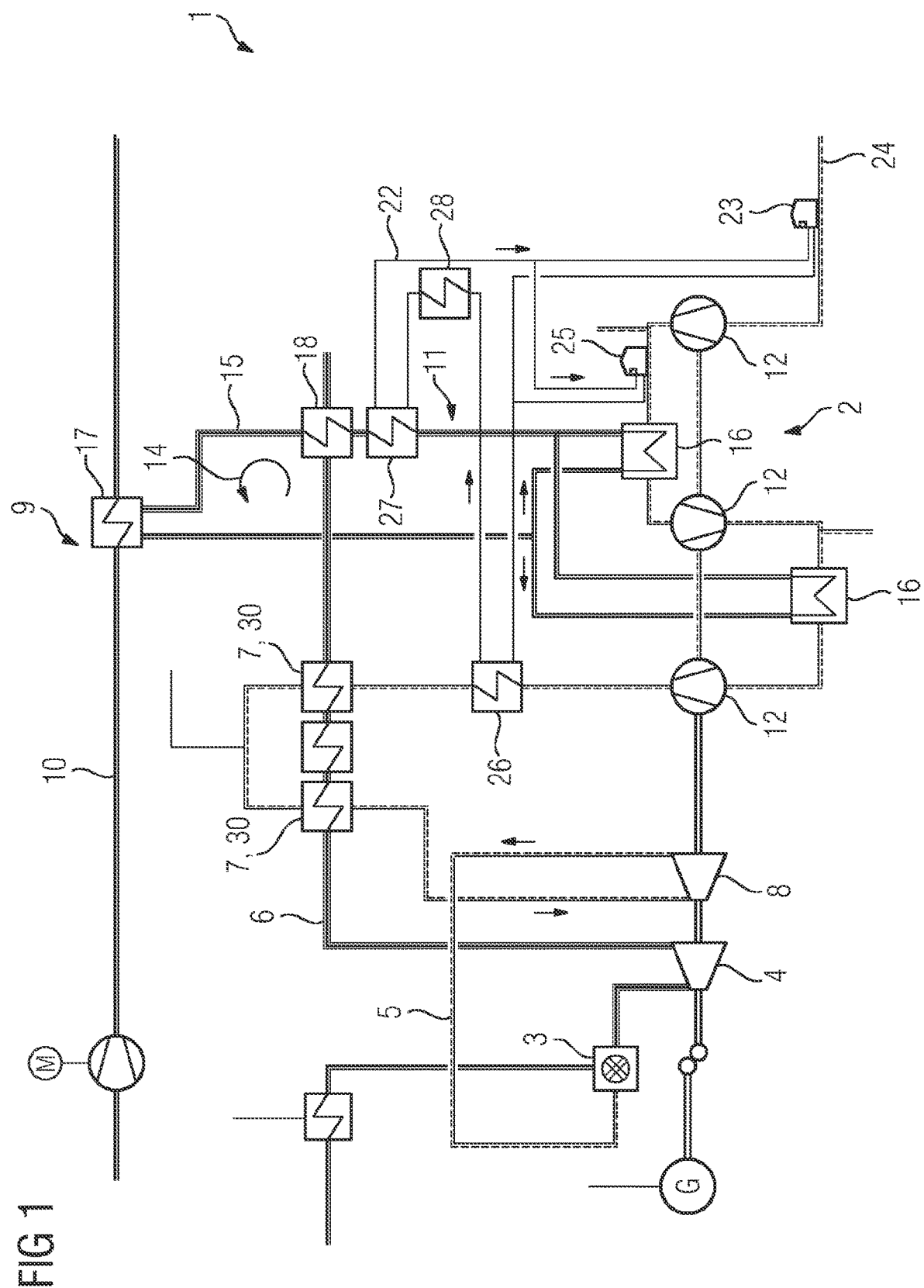
FIG. 1 a power station plant with nitrogen circuit,
FIG. 2 a power station plant with natural gas expander,
FIG. 3 a power station plant without nitrogen circuit and without natural gas expander,
FIG. 4 a power station plant without nitrogen circuit and with natural gas expander,
FIG. 5 a power station plant without nitrogen circuit and without water-glycol circuit but with natural gas expander,
FIG. 6 a power station plant with two air expanders and a natural gas expander and
FIG. 7 a power station plant with two air expanders but no natural gas expander.

FIG. 1 shows, schematically and by way of example, a power station plant 1 comprising a multistage compressor 2 with intermediate cooling, a combustion chamber 3 and a turbine 4 located downstream of the combustion chamber 3. A compressor air conduit 5 connects the compressor 2 to the combustion chamber 3 and an exhaust conduit 6 branches off from the turbine 4. A first heat exchanger 7 is installed in the compressor air conduit 5 and in the exhaust gas conduit 6. It can, as shown in FIG. 1, also be made up of heat exchanger modules 30. This is useful when, as indicated in FIG. 1 but not shown in more detail, a further heat exchanger or another apparatus is, for example, to be arranged at this position in the exhaust gas path. Furthermore, a first compressor air expander 8 is arranged in the compressor air conduit 5 between the first heat exchanger 7 and the combustion chamber 3. FIG. 1 additionally shows the inventive feature according to which the power station plant 1 comprises a device 9 for regasification of liquid natural gas having a natural gas conduit 10, where a heat transfer device 11 is installed between two compressor stages 12 of the compressor 2 and in the natural gas conduit 10.

In the embodiment of FIG. 1, the heat transfer device 11 comprises a nitrogen circuit 14 having a nitrogen conduit 15. A third heat exchanger 16 and a fourth heat exchanger 17 are installed in the nitrogen conduit 15, with the third heat exchanger 16 being installed between two compressor stages 12 and the fourth heat exchanger 17 being installed in the natural gas conduit 10. These two heat exchangers 16 and 17 enable the nitrogen circuit 14 to perform its function of cooling the compressed air and regasifying the liquid natural gas. The total efficiency of the power station plant 1 can, however, be improved when the nitrogen circuit 14 also comprises a fifth heat exchanger 18 which is installed firstly in the nitrogen conduit 15 downstream, in the flow direction of the nitrogen, of the third heat exchanger 16 and upstream of the fourth heat exchanger 17 and secondly in the exhaust gas conduit 6 where waste heat from the gas turbine process can be utilized for further heating of the nitrogen.

The embodiment of FIG. 1 further comprises a water-glycol circuit 22 having an eighth heat exchanger 23 in a compressor intake air conduit 24 for cooling and drying the compressor intake air and a ninth heat exchanger 25 between two compressor stages 12 for cooling and drying the compressor air, and having a tenth heat exchanger 26 which is installed in the compressor air conduit 5 downstream of the compressor 2 for heating the compressor air, an eleventh heat exchanger 27 which is installed in the nitrogen conduit 15 of the nitrogen circuit 14 for indirect heating of the regasified natural gas and a twelfth heat exchanger 28 for heating a water-glycol mixture in the water-glycol circuit 22 before this transfers heat to the natural gas.

Figure 2:
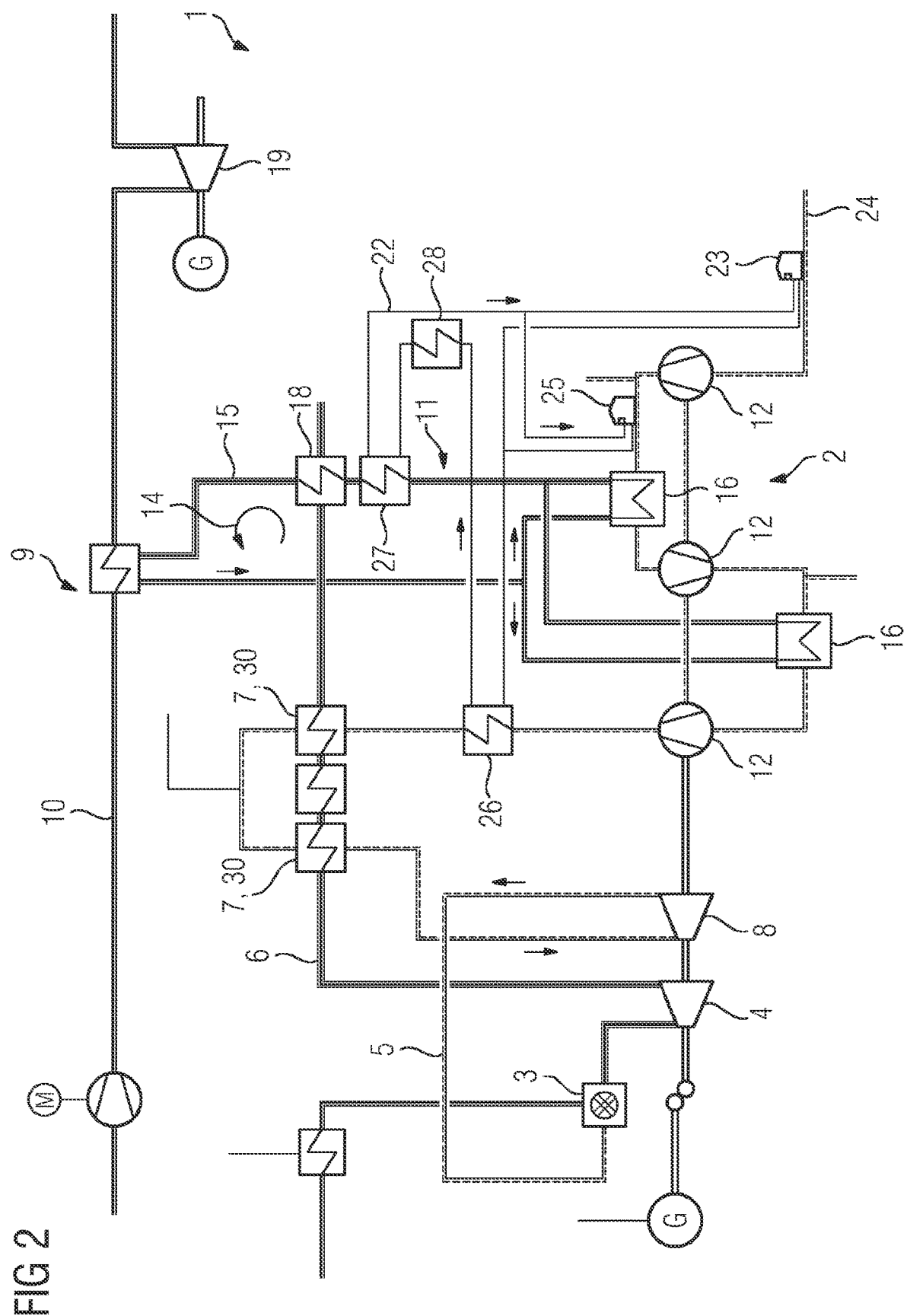

FIG. 2 shows an embodiment which, in addition to the embodiment of FIG. 1, comprises a natural gas expander 19 which is installed in the natural gas conduit 10 and which is installed in the natural gas conduit 10 downstream, in the flow direction of the natural gas, of the heat transfer device 11. Although this measure increases the capital costs, the efficiency of the total plant is improved significantly.

Figure 3:
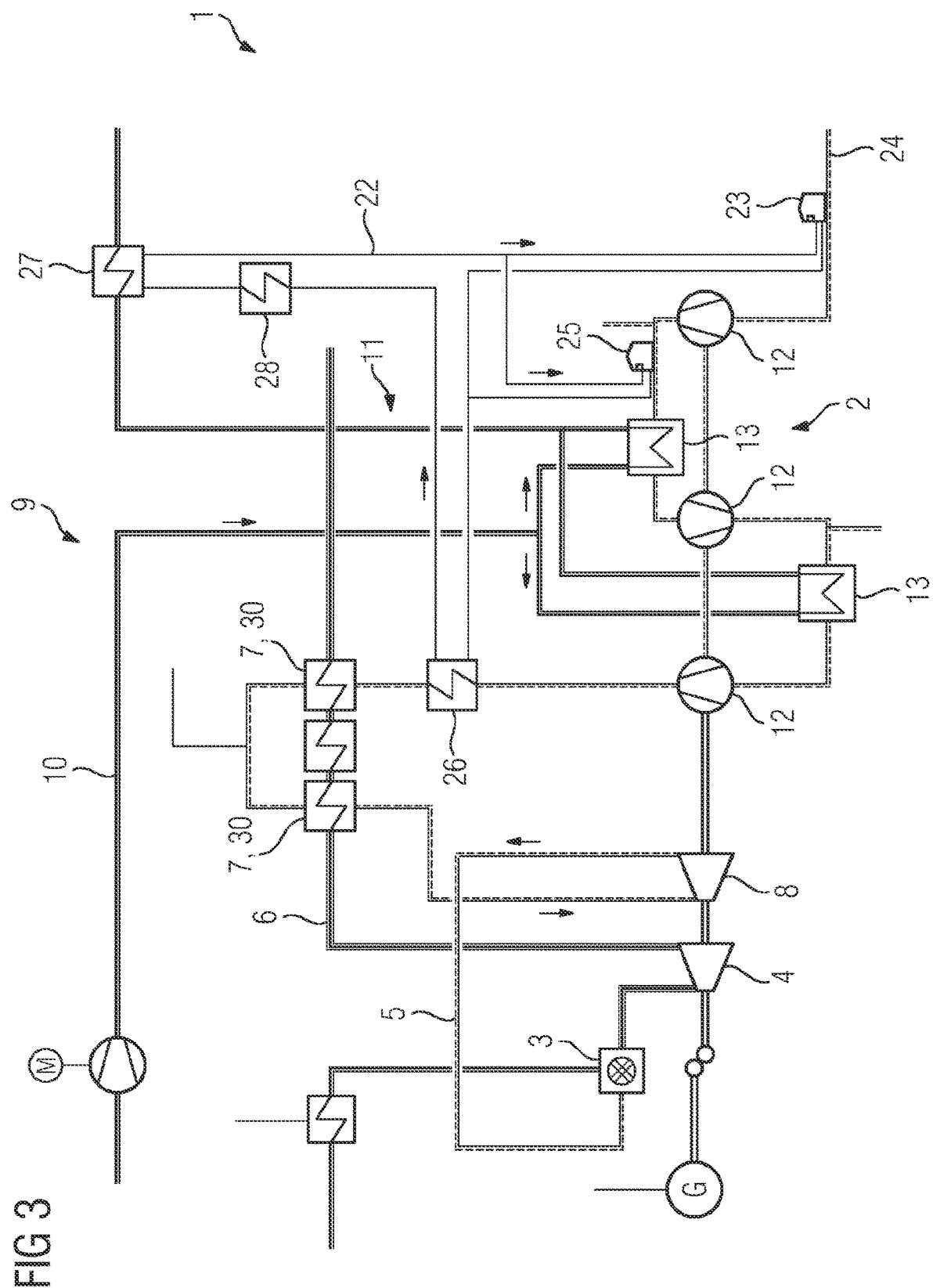

FIG. 3 shows an embodiment of the power station plant 1 which differs from that shown in FIG. 1 in that the nitrogen circuit 14 is omitted and the power station plant 1 is thus much more compact and its efficiency increases since there are no losses occurring via the nitrogen circuit 14. FIG. 3 therefore shows a second heat exchanger 13 which is installed between two compressor stages 12 and in the natural gas conduit 10. Furthermore, the embodiment of FIG. 3 differs from those shown above in that the eleventh heat exchanger 27 is now installed directly in the natural gas conduit 10 and no longer, as in the preceding working examples, in the nitrogen conduit 15.

Figure 4:
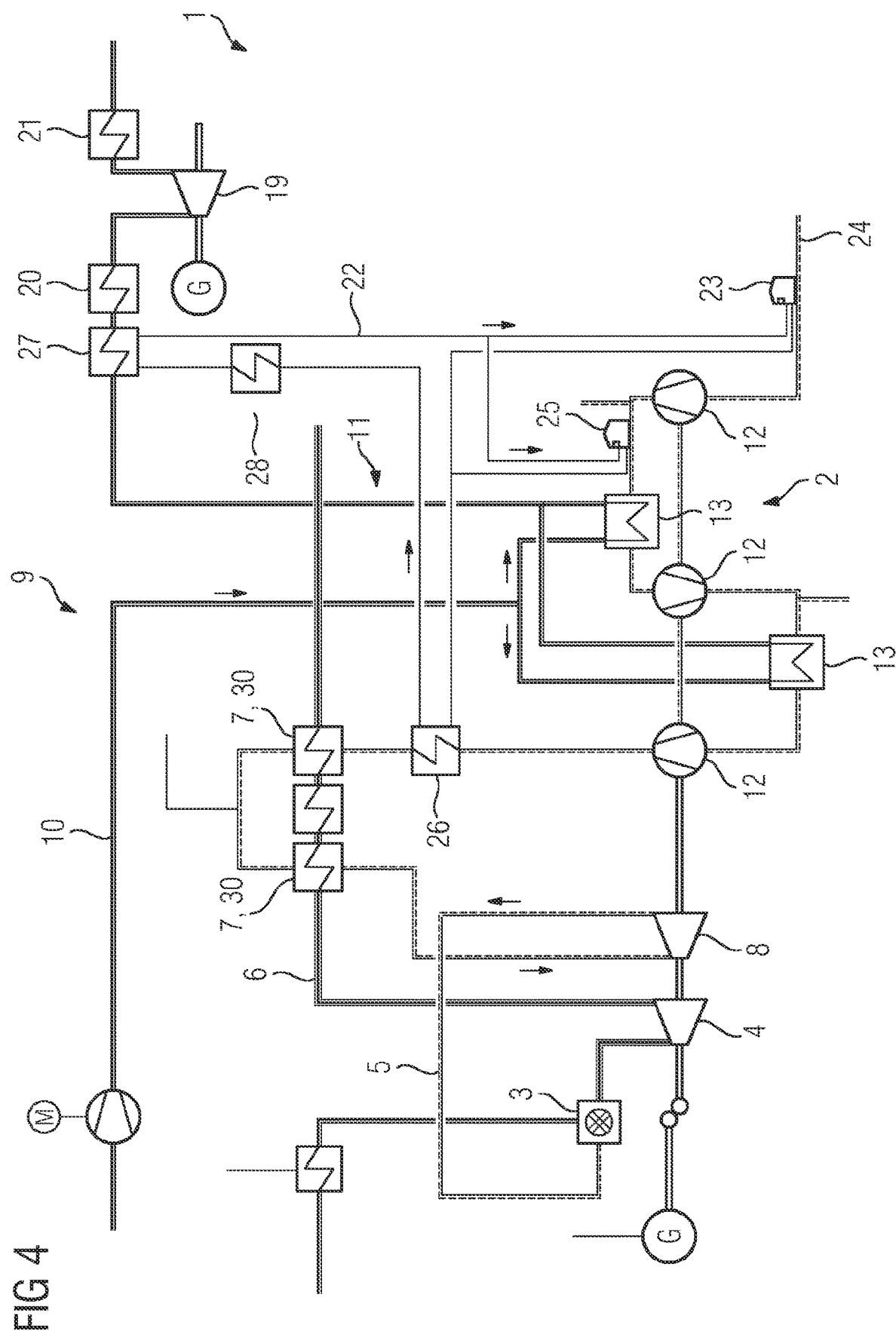

Analogously, FIG. 4 shows an embodiment which differs from that shown in FIG. 2 essentially in that the nitrogen circuit 14 is omitted. As in FIG. 2, it comprises a natural gas expander 19. Furthermore, in FIG. 4, a sixth heat exchanger 20 is arranged in the natural gas conduit 10 upstream of the natural gas expander 19 and a seventh heat exchanger 21 is arranged downstream of the natural gas expander 19, in order to additionally heat natural gas before and after expansion. The sixth heat exchanger 20 provides further heating of the natural gas before expansion, so that the utility of expansion is increased. The seventh heat exchanger 21 heats the natural gas which has been cooled during expansion and brings it to a temperature suitable for the network.

Figure 5:
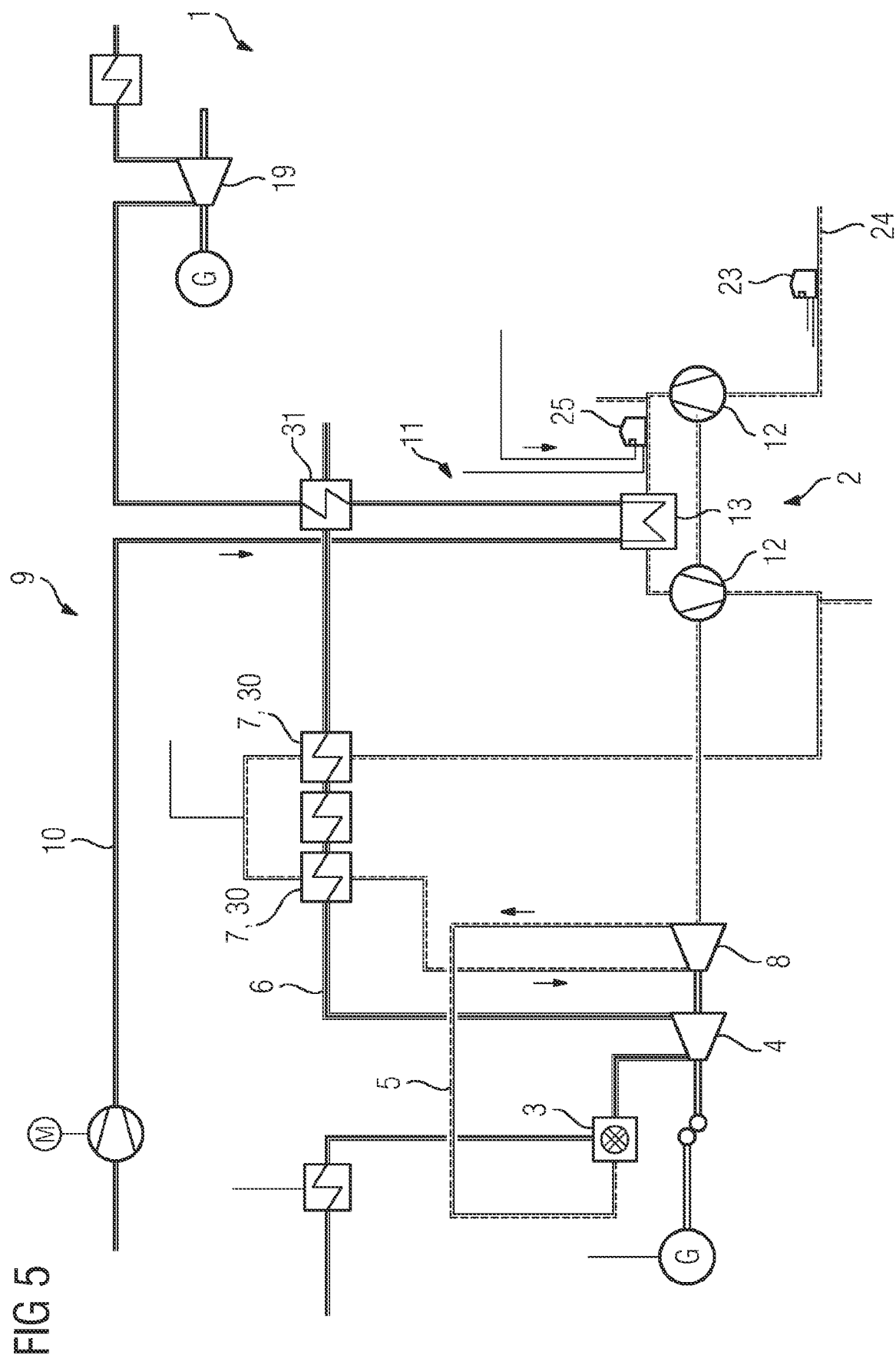

FIG. 5 shows a power station plant 1 without nitrogen circuit 14 and without water-glycol circuit 22 but with a natural gas expander 19. The capital costs are comparatively low. There are no efficiency losses occurring via a nitrogen circuit 14. The plant efficiency is high because, inter alia, of the natural gas expander 19. A twelfth heat exchanger 31, which is installed both in the natural gas conduit 10 and also in the exhaust gas conduit 6, makes it possible for exhaust gas heat which is still available to be employed usefully via the natural gas expander 19.

Figure 6:
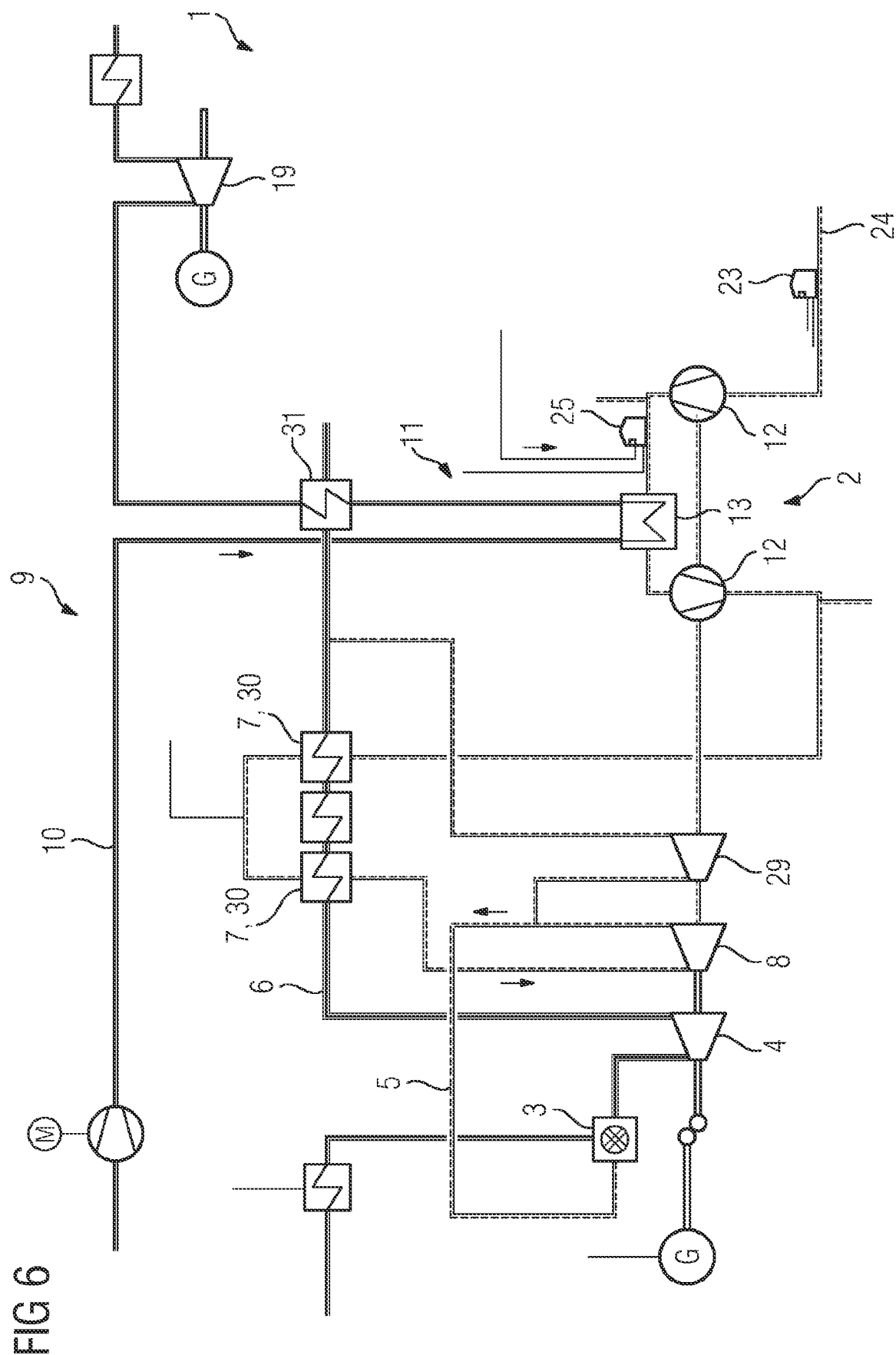
Figure 7:
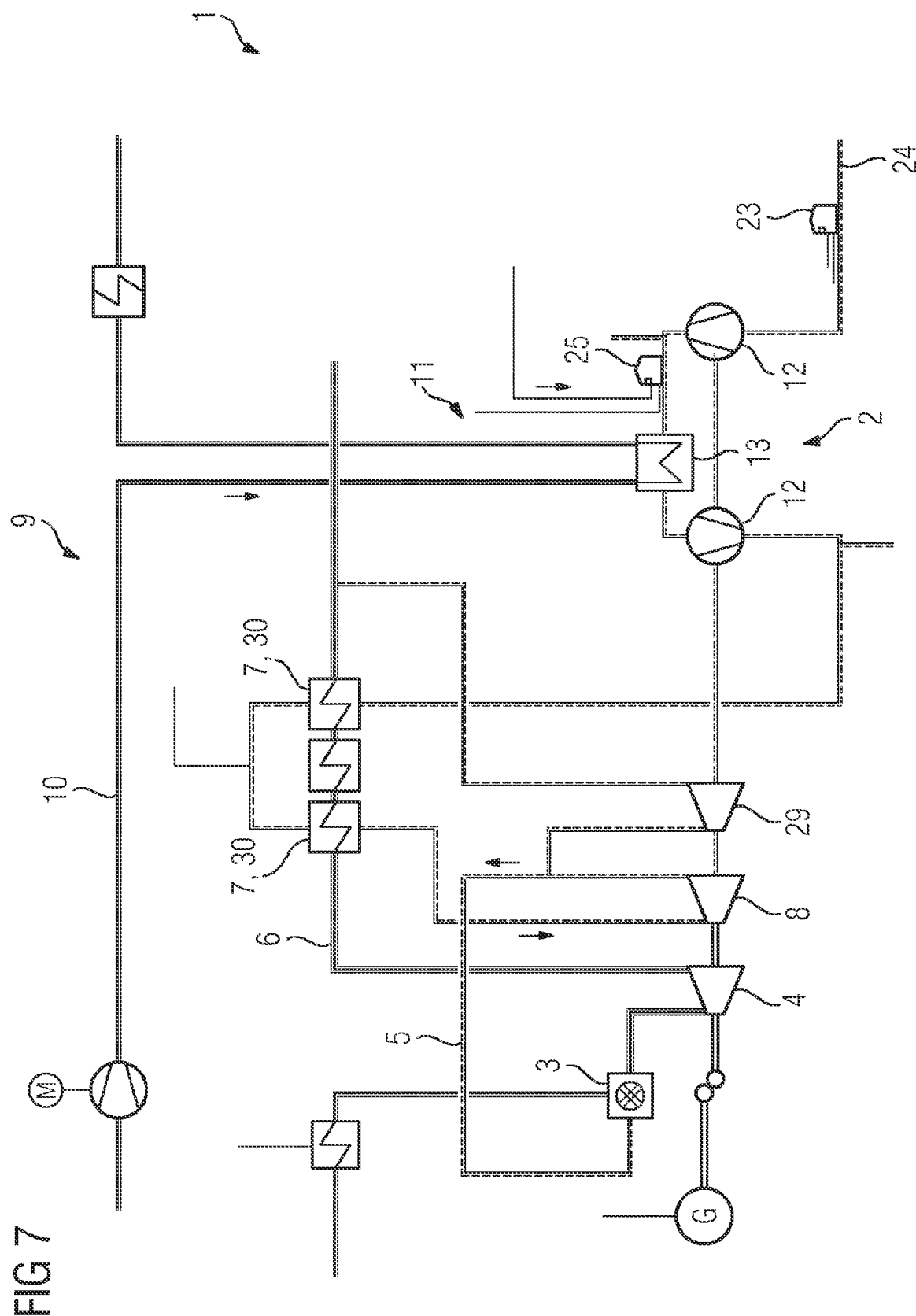

A further increase in the utilization of available heat is shown in FIGS. 6 and 7. The two embodiments comprise, in addition to that shown previously, a second compressor air expander 29 which additionally expands the part of the air which is not fed to the combustion to produce electric energy, with the expanded air being released into the exhaust gas conduit 6. The embodiments of FIGS. 6 and 7 differ merely in that in FIG. 6 the natural gas expander 19 is still provided in the natural gas conduit 10 and in FIG. 7 it is omitted, so that the embodiment of FIG. 7 can be seen as a variant of the invention which has been optimized in terms of reduced plant complexity, without intermediate circuits and without additional rotating components in conduits which convey fuel gas.

The invention claimed is:

1. A power station plant comprising:
   a multistage compressor with intermediate cooling,
   a combustion chamber,
   a turbine located downstream of the combustion chamber,
   a compressor air conduit which connects the multistage compressor to the combustion chamber and a first heat exchanger installed in the compressor air conduit and in an exhaust gas conduit branching off from the turbine,
   wherein the power station plant comprises a device for regasifying liquid natural gas having a natural gas conduit,
   wherein a heat transfer device is installed between two compressor stages of the multistage compressor and in the natural gas conduit,
   wherein a first compressor air expander is arranged in the compressor air conduit between the first heat exchanger and the combustion chamber,
   wherein the heat transfer device comprises a nitrogen circuit comprising a nitrogen conduit in which a third heat exchanger is installed between the two compressor stages and a fourth heat exchanger is installed in the natural gas conduit, and
   wherein the nitrogen circuit comprises a fifth heat exchanger which is firstly installed in the nitrogen conduit downstream, in a directional flow of nitrogen in the nitrogen conduit, of the third heat exchanger and upstream of the fourth heat exchanger and is secondly installed in the exhaust gas conduit.

2. The power station plant as claimed in claim 1, wherein the heat transfer device comprises a second heat exchanger which is installed between a pair of adjacent compressor stages of the multistage compressor, wherein the second heat exchanger is separated from the third heat exchanger by at least one compressor stage that is part of the pair of adjacent compressor stages and part of the two compressor stages.

3. The power station plant as claimed in claim 1, wherein a natural gas expander is installed in the natural gas conduit downstream, in a flow direction of the natural gas, of the heat transfer device.

4. The power station plant as claimed in claim 3, wherein a sixth heat exchanger is arranged in the natural gas conduit upstream of the natural gas expander and a seventh heat exchanger is arranged in the natural gas conduit downstream of the natural gas expander in order to heat the natural gas before and after expansion.

5. The power station plant as claimed in claim 3, wherein a twelfth heat exchanger is installed in the natural gas conduit between the heat transfer device and the natural gas expander and in the exhaust gas conduit.

6. The power station plant as claimed in claim 1, further comprising:
   a water-glycol circuit having an eighth heat exchanger in a compressor intake air conduit for cooling and drying compressor intake air or a ninth heat exchanger between the two compressor stages for cooling and drying compressor air, and having a tenth heat exchanger which is installed in the compressor air conduit downstream of the multistage compressor for heating the compressor air, an eleventh heat exchanger for further heating of regasified natural gas from regasifying the liquid natural gas and a twelfth heat exchanger for heating a water-glycol mixture in the water-glycol circuit.

7. The power station plant as claimed in claim 1, wherein a second compressor air expander is arranged downstream of the first compressor air expander and is connected on an inlet side to the compressor air conduit at a position downstream of the first compressor air expander and at an outlet side opens into the exhaust gas conduit.

8. A method for operating a power station plant, the method comprising:
regasifying liquid natural gas using heat arising in compression of compressor air,
selecting an exit pressure of a multistage compressor so as to be higher than a required turbine entry pressure and in which the compressor air is expanded before combustion,
wherein the power station plant comprises:
the multistage compressor with intermediate cooling,
a combustion chamber,
a turbine located downstream of the combustion chamber,
a compressor air conduit which connects the multistage compressor to the combustion chamber and a first heat exchanger installed in the compressor air conduit and in an exhaust gas conduit branching off from the turbine,
wherein the power station plant comprises a device for regasifying the liquid natural gas having a natural gas conduit,
wherein a heat transfer device is installed between two compressor stages of the multistage compressor and in the natural gas conduit,
wherein a first compressor air expander is arranged in the compressor air conduit between the first heat exchanger and the combustion chamber,
wherein the heat transfer device comprises a nitrogen circuit comprising a nitrogen conduit in which a third heat exchanger is installed between the two compressor stages and a fourth heat exchanger is installed in the natural gas conduit, and
wherein the nitrogen circuit comprises a fifth heat exchanger which is firstly installed in the nitrogen conduit downstream, in a directional flow of nitrogen in the nitrogen conduit, of the third heat exchanger and upstream of the fourth heat exchanger and is secondly installed in the exhaust gas conduit.

9. The method as claimed in claim 8,
wherein the liquid natural gas is brought to pressure, regasified and subsequently expanded to produce energy.

10. The method as claimed in claim 9,
wherein regasified natural gas from regasifying the liquid natural gas is heated by a first further heat source before being expanded to produce the energy and the regasified natural gas is heated by means of a second further heat source after being expanded to produce the energy.

11. The method as claimed in claim 8,
wherein compressor intake air is cooled and dried by a water-glycol circuit.

12. A power station plant comprising:
a multistage compressor with intermediate cooling,
a combustion chamber,
a turbine located downstream of the combustion chamber,
a compressor air conduit which connects the multistage compressor to the combustion chamber and a first heat exchanger installed in the compressor air conduit and in an exhaust gas conduit branching off from the turbine,
wherein the power station plant comprises a device for regasifying liquid natural gas comprising a natural gas conduit,
wherein a heat transfer device is installed between two compressor stages of the multistage compressor and in the natural gas conduit,
wherein a first compressor air expander is arranged in the compressor air conduit between the first heat exchanger and the combustion chamber, and
wherein the power station plant further comprises a water-glycol circuit comprising an eighth heat exchanger in a compressor intake air conduit for cooling and drying compressor intake air or a ninth heat exchanger between the two compressor stages for cooling and drying compressor air, and comprising a tenth heat exchanger which is installed in the compressor air conduit downstream of the multistage compressor for heating the compressor air, an eleventh heat exchanger for further heating of regasified natural gas from regasifying the liquid natural gas and a twelfth heat exchanger for heating a water-glycol mixture in the water-glycol circuit.

* * * * *